2,626,455

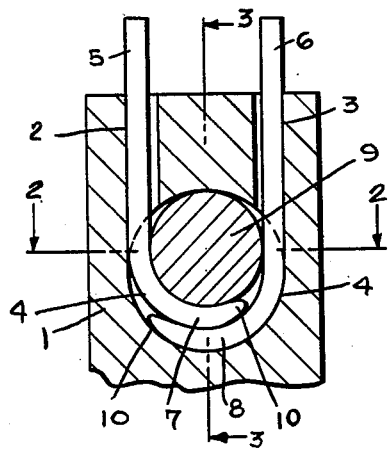
FIG-1-
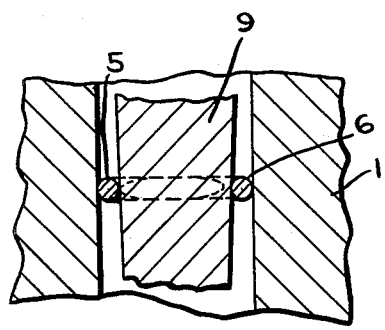
FIG-2-
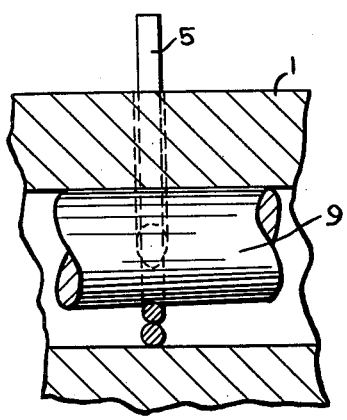
FIG-3-
INVENTOR.
CARL BERNHARD HOLM
BY
ATTORNEY Patented Jan. 27, 1953

UNITED STATES PATENT OFFICE 2,626,455

METHOD FOR CONNECTING STRUCTURAL PARTS

Carl Bernhard Holm, Roslags-Nagby, Sweden

Application August 28, 1950, Serial No. 181,805
In Sweden April 12, 1948

2 Claims. (Cl. 29—148)

This invention relates to a method of making a permanent connection between parts of a structure or a machine and particularly between valve pins or needles and their carriers.

It is the main object of the invention to produce a firm, secure and permanent connection between individual parts for use in numerous situations and in such a manner that said parts cannot become disconnected in spite of extensive use.

It is also an object of the invention to make a connection between individual members of a mechanical construction which is strong, resistant to impacts and forces, durable and simple.

It is another object of the invention to create a connection of the above mentioned character which may be easily and quickly performed without the employment of special and expensive equipment, such as screw, threads or other means subject to failure or becoming released.

It is also an object of the invention to make a permanent connection between adjoining structure or machine parts which will be free for attachment to other members.

With these objects in view the invention will now be described more in detail and with reference to the attached drawings.

In the drawings,

Fig. 1 is a vertical sectional view of an assembly of connected parts, the connection having been made in conformity with this invention, Fig. 2 is a horizontal sectional view on the line 2—2 of Fig. 1, and Fig. 3 is a vertical sectional view on line 3—3 of Fig. 1.

The parts to be permanently connected in accordance with this invention are, as apparent from the figures of the attached drawing, the two pins or needles 5, 6 and their carrier 1.

Two spaced, parallel bores 2 and 3 are axially drilled into the carrier 1, the bores entering the carrier from its upper outside face. The bores 2, 3 transite into a circular hole 4 which extends transversally to the direction of the bores 2, 3 through the carrier 1. The bores 2, 3 have a diameter which is larger than that of the pins 5, 6.

The permanent connection between the pins or needles 5, 6 and their carrier 1 is made in accordance with this invention, as follows.

First the two parallel bores 2, 3 are axially drilled into the carrier 1; hereupon the circular hole 4 is bored which extends transversally to the bores 2, 3 through the carrier 1. The mutual location of the bores 2, 3 and of hole 4 is such that the lower ends of the bores transite or open out peripherally or tangentially into the hole 4, as apparent from Figure 1.

Hereupon the two pins 5, 6 are inserted into the carrier 1 and preferably in the following manner.

Pin 6 is forcibly pushed into bore 3; the pin made of a well bendable material is upon exit from bore 3 bent along the circumference of hole 4. The insertion of the pin is continued until the end portion 8 thereof has passed along hole 4 beyond a vertical plane extending through the center of this hole.

Hereupon the pin 5 is inserted into bore 2; the pin leaving the bore slides first along the face of the hole 4 and moves hereupon into an overlapping or superposed position relative to the end of pin 6; the advance of pin 5 is continued until it has entered into hole 4 for about the same distance from a vertical center plane as pin 6.

In order to secure a friction-free by-passing of the two pins 5, 6 their carrier entering ends 10 are rounded.

Upon location of the two pins or needles 5, 6 in their overlapping position a conical bolt 9, see Figures 1 to 3, is above the pins driven into hole 4. The pins are hereby solidly and firmly connected with each other and with the carrier 1.

Other means may be used to perform the final securing step; the pins and carriers may, for instance, be connected by soldering.

The invention has been described with reference to a preferred embodiment and it will be understood that many variations and modifications thereof may be resorted to without departure from the scope of the invention as defined in the following claims.

What I claim, is:

1. In a method for connecting valve pins with a stationary support which having two spaced parallel cylindrical bores entering said carrier from its outer face and a well enclosed circular transverse passage connected with said bores and extending through said support at a right angle relative to the direction of said bores, the steps of forcing a circular pointed pin through the first bore into said transverse passage, whereby said pin upon entrance into the latter is bent along its circular wall, continuing the forced insertion until the end of said pin has advanced beyond a vertical plane extending through the center of said circular transverse passage, forcing a second pointed pin in the same manner as said first pin through said second bore, whereby the pointed ends of the pins are forced into a superposed position and hereafter permanently securing the said two pin ends in their superposed position.

2. In a method according to claim 1, forcing a conical bolt above the two pointed ends into said circular passage.

CARL BERNHARD HOLM.

REFERENCES CITED

The following references are of record in the file of this patent:

UNITED STATES PATENTS

| Number | Name | Date |
| --- | --- | --- |
| 1,843,356 | Carlough | Feb. 2, 1932 |
| 1,899,343 | Mackey et al. | Feb. 28, 1933 |
| 1,965,736 | Dillman | July 10, 1934 |
| 2,219,591 | Hiester | Oct. 29, 1940 |
| 2,397,585 | Anderson | Apr. 2, 1946 |
| 2,432,307 | Good, Jr. | Dec. 9, 1947 |